United States Patent [19]

Crupi et al.

[11] Patent Number: 4,703,416
[45] Date of Patent: Oct. 27, 1987

[54] APPARATUS FOR LOCATING PROGRAMS RESIDENT ON A CARTRIDGE OF A CARTRIDGE PROGRAMMABLE COMMUNICATION SYSTEM

[75] Inventors: Joseph A. Crupi, Eatontown; David J. Hayward, Lincroft; David F. Jones, Middletown, all of N.J.

[73] Assignees: American Telephone and Telegraph Company, New York, N.Y.; Bell Telephone Laboratories, Incorporated, Murray Hill, N.J.

[21] Appl. No.: 777,515

[22] Filed: Sep. 19, 1985

Related U.S. Application Data

[63] Continuation of Ser. No. 448,739, Dec. 10, 1982, abandoned.

[51] Int. Cl.⁴ .............................................. G06F 12/06
[52] U.S. Cl. ................................. 364/200; 379/157; 379/165
[58] Field of Search .............. 179/18 ES, 18 B, 99 M, 179/99 R; 379/159, 165, 284; 364/200 MS File, 900 MS File, 706, 709, 419

[56] References Cited

U.S. PATENT DOCUMENTS

| Re. 30,671 | 7/1981 | Poland ................................ 364/706 |
| 4,095,791 | 6/1978 | Smith et al. ........................... 273/85 |
| 4,156,796 | 5/1979 | O'Neal et al. .............. 179/18 ES X |
| 4,232,199 | 11/1980 | Boatwright et al. .............. 179/18 B |
| 4,259,549 | 3/1981 | Steehman ....................... 179/18 ES |
| 4,259,668 | 3/1981 | Nishmura et al. ................... 340/711 |
| 4,291,196 | 9/1981 | Spaniol et al. ............. 179/18 ES X |
| 4,442,321 | 4/1984 | Stehman ..................... 179/18 ES X |

*Primary Examiner*—Gary V. Harkcom
*Assistant Examiner*—David L. Clark
*Attorney, Agent, or Firm*—John A. Caccuro

[57] ABSTRACT

A communication system controller is operable under program calls from two memories which are independently changeable. A first memory includes a group of hardware-dependent programs and a second memory includes a group of hardware-independent programs. Calls are initiated by programs resident on the first memory to an interface program resident on the second memory at an address known to programs of the first memory. This interface program call includes an argument indentifyng the function program to be called. The interface program uses the argument to determine the location of the function program from a program table and then transfers control to the function program.

9 Claims, 4 Drawing Figures

APPARATUS FOR LOCATING PROGRAMS RESIDENT ON A CARTRIDGE OF A CARTRIDGE PROGRAMMABLE COMMUNICATION SYSTEM This is a continuation of application Ser. No. 448,739 filed Dec. 10, 1982, now abandoned.

TECHNICAL FIELD

This invention relates to program controlled communication systems and, more particularly, to a method and circuitry for controlling communications between a programmed controller of a key telephone system and a cartridge connected thereto.

BACKGROUND OF THE INVENTION

Modern key telephone systems are being developed which operate under program control to provide an ever increasing variety of calling features. Typically, these programs are contained in read-only memories (ROMs) located on memory cards. To minimize program changes required to accommodate changes to system hardware or operating features, the system memory can be arranged into hardware-dependent (personality) and hardware-independent (feature) modules. Thus, for example, when a change is made in the operating feature only the feature module need be changed. To facilitate changes to operating features, interchangeable memory cards or cartridges can be utilized.

For example, in the copending U.S. patent application, Ser. No. 445,982, filed on Dec. 1, 1982, by Bennett et al, now U.S. Pat. No. 4,506,346 a programmable cartridge based telephone communication system is disclosed where a variety of user interchangeable cartridges can be plugged into the system to program a variety of operating features. Since the addresses of existing feature programs may vary from cartridge to cartridge or since a new program may be added on subsequent cartridges, programs resident on the personality module of the system require a method of locating programs resident on any of these feature cartridges and vice-versa.

SUMMARY OF THE INVENTION

A communication method and circuitry is disclosed which enables a programmed communication system controller which is responsive to program calls from instruction sets resident on a personality module to locate and activate instruction sets resident on the personality module or on any one of a variety of feature cartridges connected to the system. The address of the instruction sets are stored in an address table which may be in a different location on each cartridge. The present invention utilzes an interface program located at a fixed address known to all instruction sets and which is located at the same address on each feature cartridge and which knows the location of the address table in that feature cartridge. The interface is responsive to an interface call which includes an identifier for determining the location of the instruction set identified in the call. The called instruction set contains instructions for controlling the system hardware to carry out the desired communication function. The identifier of the interface call is an index for accessing a function table to obtain an index to the address table which contains the location information for the called instruction set. The interface uses a pointer to locate the address of the function table.

BRIEF DESCRIPTION OF THE DRAWING

The detailed description of the invention will be more fully appreciated from the illustrative embodiment shown in the drawing, in which.

GENERAL DESCRIPTION

In a preferred embodiment, the sequence of operations originates with a call to the interface made by the personality module. This call is in response to an external stimuli from telephone apparatus or a telephone user. A call includes an identifier (e.g., a parameter or an argument) which specifies the instruction set (e.g., a function program) to be called. The call (e.g., a command) includes other arguments which specify, for example, which station, facility and call identifiers are to be used by the called function program to carry out the particular communication function. In the present invention, the function program or command identifier is a function table index which is used as the first argument of each call. The interface (in the disclosed embodiment a program located on the feature cartridge) uses this index to access a function table to determine whether the called function program is resident on the personality module or the feature cartridge and also obtains an address table index for the desired program.

When the called function program is resident on the feature cartridge, the interface program uses the address table index to access the proper entry in the feature cartridge address table, to obtain the absolute address of the function program to be performed. However, if the called function program is resident on the personality module, the interface program obtains from a pointer location the starting address of the personality module address table. The interface program combines the address table index with the starting address of the personality module address table to locate the entry in the personality module address table containing the address of the called function program.

After the interface program locates the called function program, all of the arguments are passed to the program, and the controller proceeds to carry out the program instructions to perform the desired communication function.

DETAILED DESCRIPTION

Figure 1:
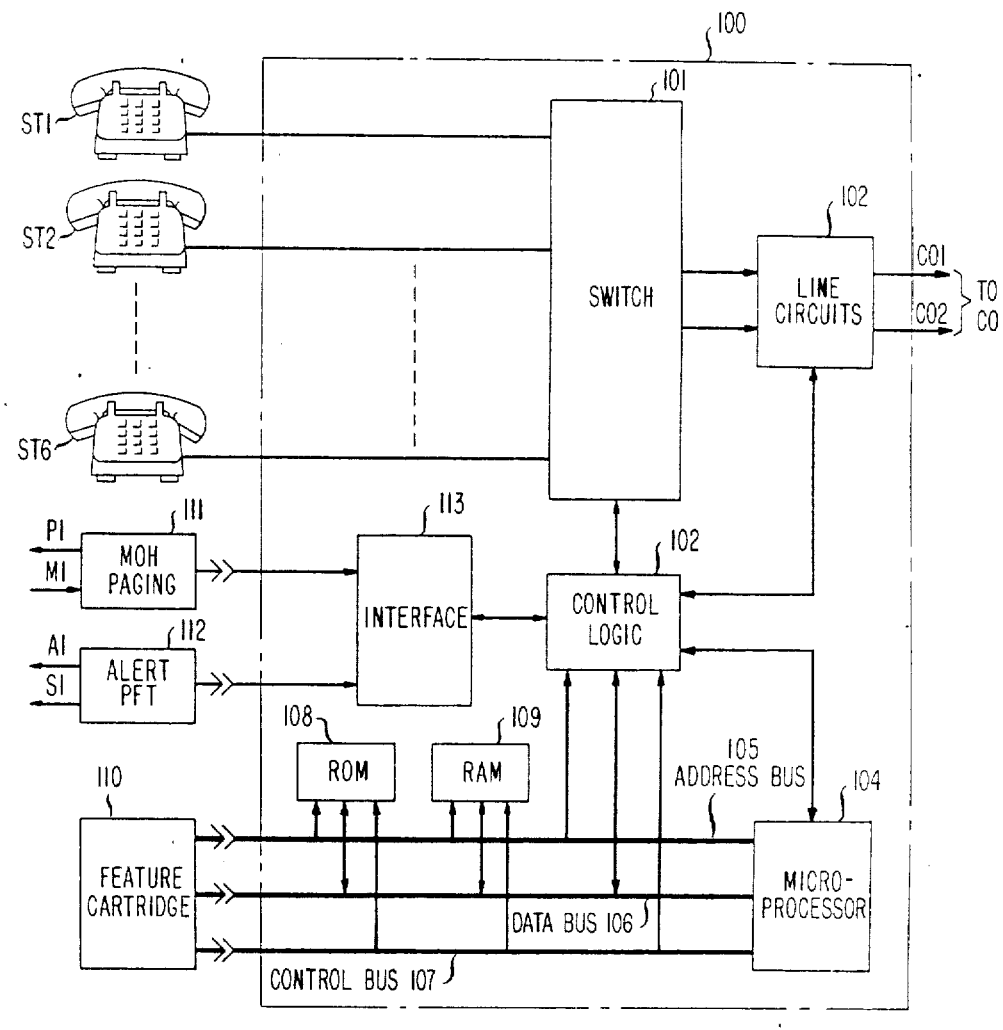
FIG. 1 is a block diagram of a communication system utilizing the invention.

FIG. 1 shows a preferred embodiment of the present invention in a communication system. The communication system of FIG. 1 includes common controller 100 which accommodates up to six telephone lines connected to station sets, ST1–ST6, and two central office (CO) lines, CO1 and CO2. Common controller 100 establishes and controls all intercom and central office communications involving the station sets. Controller 100 includes switch 101 which operates in response to signals from control logic circuit 102 to establish communication connections between station sets ST1–ST6 and CO lines CO1 and CO2, via line circuits 102.

Control logic circuit 102 provides in a well-known manner various system timers, programmable tone generators, network control logic, and signals for selecting and controlling system communication connections in response to commands received from microprocessor 104. Microprocessor (CPU) 104 is connected via address bus 105, data bus 106 and control bus 107 to read-only-memory (ROM) 108, random-access-memory (RAM) 109 and control logic 102.

Common controller 100 has three user accessible cartridge recepticals 110, 111 and 112 for inserting optional cartridges. User interchangeable programmed memory feature cartridge 110 connects to controller 100 via busses 105, 106 and 107 to provide instructions for controlling the operation of various optional system features. User interchangeable hardware cartridge 111 provides the system with a music-on-hold capability utilizing an externally provided music source connected to input M1 and a system paging capability via paging output P1. User interchangeable hardware cartridge 112 provides the system with both a power failure transfer, via leads S1, and external alert capability, via leads A1. Hardware cartridges 111 and 112 are connected to controller 100 via interface unit 113 which is controlled by control logic 102. An embodiment of the above communication system, which utilizes interchangeable feature cartridge 110 and hardware cartridges 111 and 112, is described in the copending U.S. patent application Ser. No. 445,982 filed by Bennett et al on Dec. 1, 1982, now U.S. Pat. No. 4,506,346.

Microprocessor 104 receives program instructions from ROM 108 and/or feature cartridge 110 to perform the features and functions of the communication system. Memory RAM 109 is utilized for storing and accessing user generated data associated with performing the desired function programmed in ROM 108.

In the present embodiment ROM 108 and RAM 109 provide, respectively, the program memory and temporary memory required for performing the basic system communication functions. Additional and/or optional features and functions of the communication system may be programmed in user interchangeable feature program cartidge 110. Feature cartridge 110 could, for example, provide additional ROM and RAM for storing program instructions and temporary data associated with new features and functions. As described in the above-identified Bennett et al application, the connection of program cartridge 110 replaces part of ROM 108 and/or RAM 109 to implement these new features and/or functions in the communication system.

Figure 2:
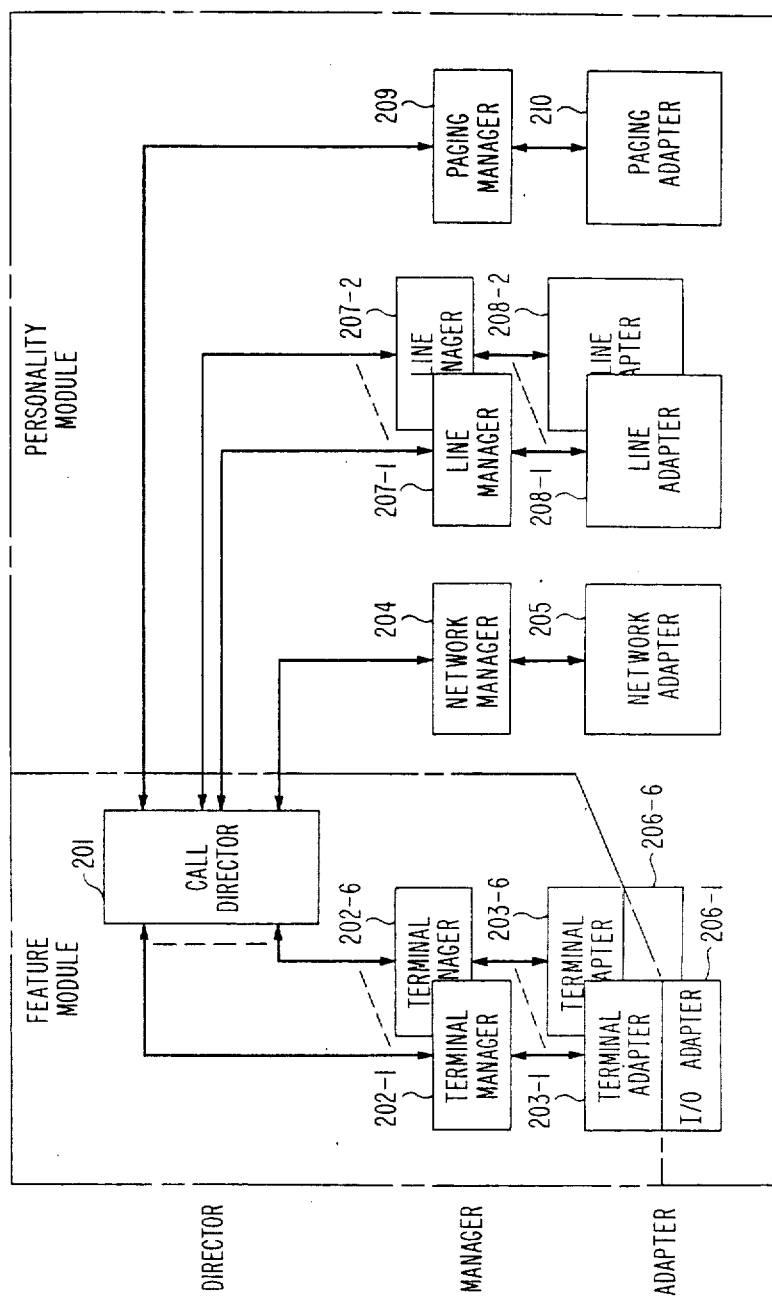
FIG. 2 is a block diagram of the architecture of the communication system of FIG. 1.

FIG. 2 shows a preferred embodiment of an architecture which may be utilized in the system shown in FIG. 1. To facilitate the addition of or changes to system operating features, the system is partitioned into a feature module (FM) and a personality module (PM). When the communication system shown in FIG. 1 does not contain the optional feature cartridge 110, both the feature programs and personality programs reside in ROM 108. When optional features are desired, the appropriate feature cartridge 110 is connected to controller 100 to add to or replace feature programs located in ROM 108, as described in the above-referenced Bennett et al patent application.

In accordance with the present invention, the disclosed communication method permits programs resident on the pesonality module to call modules resident on the feature program, whether located on ROM 108 or feature cartridge 110, without knowing the addresses of those programs. This method permits a variety of feature programs located on different feature cartridges to be utilized with the communication system by merely the substitution of feature cartridges. Moreover, when the communication system product line is comprised of several similar communication systems, that differ in the number of lines and stations that the systems can handle, the same feature cartridge can be shared among these systems.

The following paragraphs provide a background for understanding the disclosed communication method between the feature (module cartridge) and the personality module shown in FIG. 2. The block diagram of FIG. 2 shows the feature module as including call director 201, a group of terminal managers 202-1 through 202-6, and the feature dependent parts of a group of terminal adapters 203-1 through 203-6. The present embodiment requires one terminal manager and one terminal adapter per station set, ST1-ST6 of FIG. 1. Since changes to the capability of a communication system would likely involve changes in the type of station sets or terminals with which the system operates, the feature module as shown in FIG. 2 includes terminal adapters 203-1 through 203-6 and terminal managers 202-1 through 202-6. Thus, changing the feature cartridge accommodates changes in both the system operating features and changes in the type of terminals connected to the system.

In FIG. 2 the personality module includes network manager 204, network adapter 205, line managers 207-1 and 207-2, line adapters 208-1 and 208-2, paging manager 209, paging adapter 210 and the input/output portions of the terminal adapter 206-1 through 206-6. These blocks or modules of the personality module may be hardware dependent modules, also known as hardware driver programs, which interface the system to the specific hardware.

Network adapter 205 is responsive for receiving hardware status from, and transmitting harhdware stimuli to, switch network 101. The network adapter decodes requests, updates network hardware status, and generates call program tones. The network adpater converts the raw hardware dependent variables into a hardware independent language for communication to network manager 204. Thus, the network adapter translates specific hardware signals to and from functional language commands to make or clear connections to specified ports or links of the switch network.

Line adapter 208 scans the CO lines for changes in the state of the CO lines (CO1 and CO2) and reports any changes in a hardware-independent language to line manager 207. Line adapter 208 receives commands from line manager 207 which are decoded and executed in hardware-dependent language. Thus, line adapter 208 generates and receives hardware signals which enable the system to perform the standard CO line functions such as conferencing, queuing, dialing, disconnecting, holding, outpulsing, recalling, seizing and tone signaling.

Similarly, paging adapter 210 receives and outputs hardware stimuli to interface to various paging devices. The paging manager 209 receives and transmits device independent commands to control paging adapter 210.

Terminal I/O adapters 206-1 through 206-6 interface with control logic 102. Control logic 102 includes circuitry which periodically polls the connected station sets ST1-ST6 (or other voice or data communication devices) and receives status therefrom. Each of the terminal adapters receives information from an associated station set which is consolidated from a polling operation performed by control logic 102. This information includes various arguments to specify the call priority, station identification, button type, and button identification. Each of the terminal I/O adapters 206-1 through 206-6 converts this hardware-dependent information or signals into a hardware-independent language which is communicated to the associated hardware-independent terminal adapters 203-1 through 203-6. The communications or commands between the terminal managers 202-1 through 202-6 and terminal adapters 203-1 through 203-6 updates various visual, audible and button states of the station sets connected to the system. These commands turn off, turn on, flutter, wink, or flash the red or green light-emitting diode of the station sets, or enable voice or tone signaling from the station sets.

The communications between the network manager 204, terminal managers 202-1 through 202-6, line manager 207, paging manager 209 and call director 201 utilize well-known calls or commands which identify the function program to be called to perform the requested function. The call also includes the various arguments which specify the parameters necessary to carry out the function. Thus, the appropriate arguments such as the call identification CID, station identification SID, CO line FID, resource identification RID, status ST, etc. are included with each call.

Note, if the feature module of FIG. 2 is designed not to be interchangeable with other feature modules, the programs of the personality module would be programmed with the absolute addresses of all programs of the system and hence would not need the disclosed invention. In such an arrangement, calls would have the form FCN (A1, A2, A3) where FCN is the absolute address of the program or function being called and A1-A3 are the various arguments or parameters of the program call. In a well-known manner, the operating system of microprocessor 104 of FIG. 1 receives this call and the associated arguments, sets the program counter to the address FCN, and starts to sequentially execute the instruction of the called program to perform the desired function.

However, since in the disclosed system any of a variety of feature cartridges may be connected to the system, the absolute addresses of function programs located on the feature cartridge are not likely to remain the same on different feature cartridges. The disclosed communication method enables programs located on the personality module to locate and communicate with the programs resident on any of the feature cartridges. Moreover, since the feature cartridge is completely isolated from hardware-dependent code, any hardware changes in the controller can be compensated for by changes only in the appropriate programs of the personality module and require no changes to the feature program cartridges.

Figure 3:
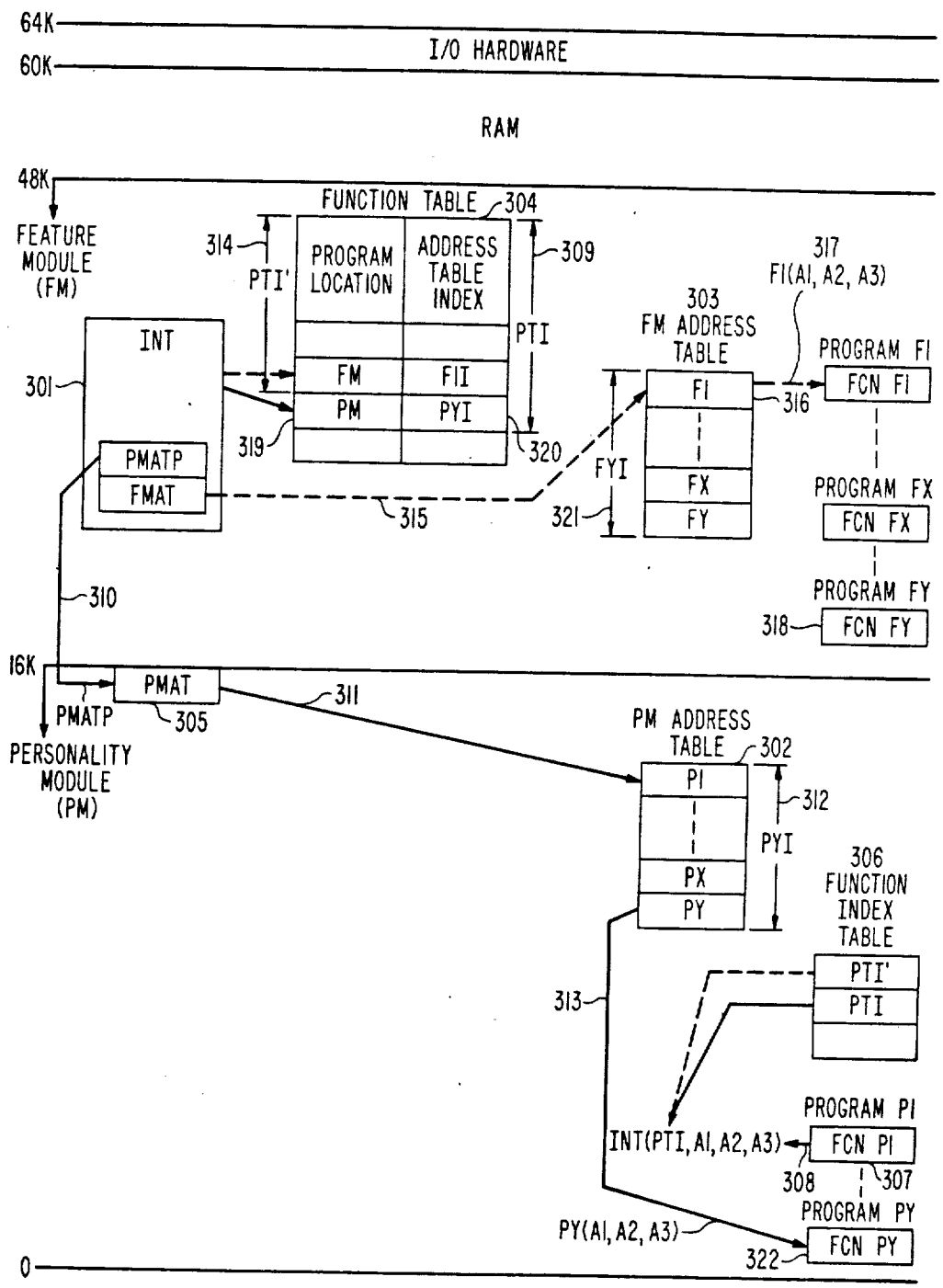
FIG. 3 is a system instruction map useful in describing the present invention.

FIG. 3 shows a system instruction map which in the present embodiment is a 64K memory including RAM 109 and ROM 108 of controller 100 of FIG. 1. The memory map shows ROM occupying the first 48K bytes (addresses), RAM occupying the next 12K bytes and I/O hardware instructions occupying the last 4k of memory addressing. The ROM memory is partitioned between the personality module PM (0-16K) and the feature module FM (16K-48K). As described in the previously-referenced Bennett et al application, ROM bank switching permits a section of the feature module located in ROM 108 to be switched out and replaced by ROM located on the feature cartridge.

As noted, the above PM/FM partition plan permits changing either the feature module or the personality module without a concomitant change in the other. For example, a new feature cartridge could replace either one function program or the entire feature module located on ROM 108, or could add one or more feature programs thereto. To implement this flexibility requires a communication method which allows each program to ascertain the absolute address of any function program it needs, independent of where the program is resident.

The communication between the personality module and the feature module places several constraints on call (command) execution. The method utilizes an interface (e.g., a program) for determining a program's absolute address to permit inter-module program calls. The interface program is shown as 301 in FIG. 3. In a preferred embodiment, the interface program requires several tables including PM address table 302, FM address table 303, command or function table 304 and a PM address table pointer 305.

Personality module (PM) address table 302 is resident on the personality module and consists of the absolute address of every foreground task, background task, and inter-module command resident on the personality module. Addresses can be entered in any order; however, to preserve FM/PM independence the order must remain constant when making alterations to the program addresses. It should be sufficient to change an address in place or add new addresses to the end of the table.

Feature module (FM) address table 303 is resident on the feature module and consists of the absolute address of every foreground task, background task, and inter-module command resident on the feature module. Addresses can be entered in any order; however, to preserve PM/FM independence the order should remain unchanged when making alterations to the program addresses. It should be sufficient to change an address in place or add new addresses to the end of the structure.

Function table 304 located on the feature module contains one entry for every inter-module program. This table is used by interface program 301 to determine the absolute address of called programs. Each program's entry consists of the program's location (FM or PM), and its address table index. The order in which entries are made must be preserved when changing this table; it should always be sufficient to change an entry in place, or add new entries to the end of the table.

Function index table 306 is located on personality module and contains a list of every inter-module program. Note, the order in which inter-module programs are listed in this table is identical to the order of entries in the program table 304 to assure an identical address table index. Note, in a preferred embodiment, function index table 305 is not utilized, rather the index information is included in the programs of the personality module.

Personality Module address table pointer (PMATP) 305 specifies the starting address of the personality module address table. It resides at a known and unchangeable location in the personality module.

On FIG. 3 the function programs resident on personality module are designated as P1-PY, and the function programs resident on feature module are designated F1-FY.

Figure 4:
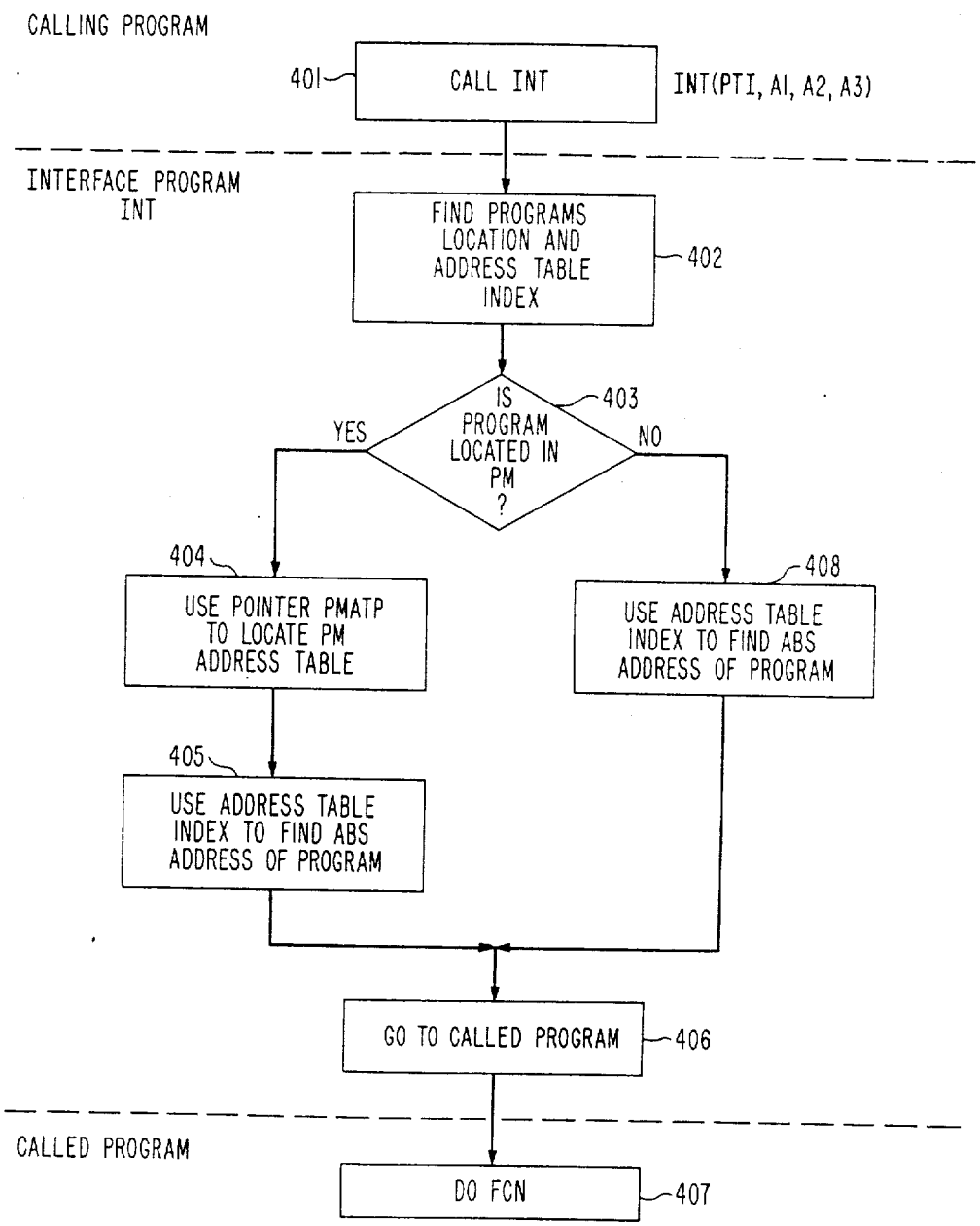
FIG. 4 shows typical control steps used by the invention.

With joint reference to FIGS. 1, 2, 3 and 4, the disclosed communication method is described which enables programs on the personality module to locate programs on the feature module or feature cartridge. As noted, interface program 301 enables all software modules of FIG. 2 to execute inter-module calls. FIG. 4 shows in a flow chart for the protocol operations as performed by interface program 301.

Assume that a system user presses a feature button on a station set ST1 of FIG. 1. Control logic 102 detects the button depression operation on its next poll of station ST1. Control logic 102 transfers the raw station status information on the button depression to terminal adapter 206-1, which interprets the information as being a request for a particular function, function PY for example, to be performed by the system. Program P1, which generates interface program calls for terminal adapter 206-1, determines the function table index for the particular function index program from function table 306 and uses the index as the first argument of a call 308. The interface program call has the format INT (PTI, A1, A2, A3). Illustratively, 308 and 401 describe a call to the interface (INT) program. The call identifies the absolute address of interface program INT and the first argument in the function table index of the function program (PTI) to be called. The remaining arguments A1, A2, and A3 of the call are the parameters to be passed to the called program PY to execute the desired function.

Since all programs of the pesonality module know the absolute address of interface program 301, it enables all programs to initiate inter-module calls. In step 402 interface program INT uses the first argument of the call, i.e., the program table index PTI, to obtain, 309, the called program's location (PM, indicating personality module) and address table index (PYI) from program table 304. Interface program INT does this by adding the program table index PTI to the starting address of the program table 304.

In step 403 the program location contents PM of program table 304 is accessed to determine if the desired called program is located on the personality module (i.e., on ROM 108) or on the feature module (i.e., on the feature cartridge). Since we have assumed that the desired program PM is located on the personality module, step 404 is performed next. In step 404 the address contained in personality module address table pointer (PMATP) 305, i.e., PMAT, is used, 311, to locate PM address table 302. Thereafter, in step 405 the address table index, PYI, of step 402 is combined with PMAT to locate the entry in PM address table 302 containing the absolute address PY of the called program. Thereafter, in step 406 interface program 301 transfers control to program PY to perform the desired function. As shown in step 313 interface program uses the absolute address to locate program PY (322) and transfers arguments A1, A2, A3 thereto. Note, the result is the same as it would have been had program P1 known the absolute address of program PY.

Assuming that program P1 desired to call a program F1 resident in feature cartridge 110, interface program uses the program table index PTI' for F1 to obtain, 314, the program location (FM, indicating feature module) and addreess table index (F1I) from program table 304. This sequence is shown by steps 401 and 402 of FIG. 4. In step 403, since the desired program is located on the feature module, step 408 follows step 403. Thus, interface program 301 combines the address FMAT of FM address table 315, together with the address table index (F1I), to locate, 315, the absolute address of program F1 in FM address table 303. Thereafter, in step 406 interface program 301 passes control, 317, to program F1 with the appropriate arguments A1, A2, and A3. The operating system then performs the instructions specified by program F1, performing the desired function.

Again, if the location of the programs of feature cartridge 110 never changed, programs of personality module could be programmed to directly call programs of the feature cartridge. However, since the location of programs on the feature program change depending on the feature cartridge utilized, a call to interface program 301 is required to locate the absolute address of any program. Programs resident on the feature cartridges can always be found as long as the absolute address are stored at the proper address table index location of the FM address table 303. Note, the absolute address of FM address table 303 can be variable, as long as a pointer FMAT contains the starting address of the table.

Additionally, as noted previously, the disclosed arrangement enables a program resident on the personality module to be replaced by a new program resident on the feature cartridge. This is accomplished by changing the entry for that program in the program table 304 from a personality module PM to a feature cartridge FM location and, accordingly, changing the address table index to reflect the programs new location in the FM address table 303. Thus, for example, if program PY (322) is to be replaced by program FY (318), then the program table entry 319 would be changed from PM to FM and the address table index entry 320 would be changed from PYI to FYI. The index FYI would refer to entry 321 in FM address table which contains the address of the new program FY.

In the event that program locations are changed or programs are added on the personality module, the absolute address of these programs must be updated in PM address table 302 to assure that the program can be located when called. Moreover, the location of PM address table can be changed as long as PM address pointer 305 has the new starting address for the table. However, the location of PM address table pointer 305 must remain fixed so that interface program 301 has a starting point for locating PM address table 302.

In the preferred embodiment described above, PM address table pointer 305 is only required when the location of PM address table 302 varies with the personality module utilized. Thus, if PM address table 302 remains at a fixed location, its address would be known to programs of the feature module and, hence, PM address table pointer 305 would not be needed. Similarly, if the location of programs P1-PY of the personality module are fixed, there is no need for PM address table 302, since the absolute address of program P1-PY can be stored in the address table index location of program table 304. Similarly, with regard to FM address table 303 and programs F1-FY of the feature module cartridge.

Note, while in the present invention interface 301 is implemented as a program, it should be noted that it could be implemented in hardware using, for example, integrated circuits. Additionally, any or all of instruction sets (programs), tables and/or pointers utilized in the present invention could likewise be implemented in other forms of software, firmware or hardware. Thus, what has been disclosed is merely illustrative of the present invention. Other arrangements and methods can be implemented by those skilled in the art without departing from the spirit and scope of the present invention.

What is claimed is:

1. A programmed controller of a communication system for controlling communication between a plurality of communication lines in response to instruction sets located on memories, said controller executing each instruction set to perform a predetermined communication function, said controller comprising a first memory including
a first group of instruction sets, each of said instruction sets extending from a starting address;
one of a plurality of interchangeable second memories, each second memory including
a second group of instruction sets, each of said second group of instruction sets extending from a starting address which is not the same for all of said second memories,
an address table for storing in a fixed order the starting addresses of each of said second group of instruction sets, the address table within each said second memory not being located at an address which is the same for each of said plurality of second memories,
a table entry index for accessing a particular instruction set starting address within the address table, and
interface program means located at a common address within each of said second memories for instructing said controller therefrom, said interface program means including the address of said address table and said starting address of said first group of instruction sets and responsive to a program call including an identifier for selecting said table entry index for either locating in said first memory the starting address of a particular instruction set or locating in said second memory the starting address of a particular instruction set using said address table and said table entry index selected using said identifier; and
said first memory further including interface calling means for generating said program call to said interface program means at said common address, said program call including said identifier.

2. The controller of claim 1 wherein said first memory further includes
a first memory address table for storing in a fixed order the starting addresses of each of said first group of instruction sets,
a first memory table entry index for accessing a particular starting address within the first memory address table, and
said interface program means including the address of said first memory table entry index for locating in said first memory the starting address of a particular instruction set.

3. The controller of claim 2 further including:
a plurality of interchangeable first memories each having a first memory address table not being disposed at the same memory address;
a pointer located at a common address within each of said first memories for storing the address of said first memory address table; and
said interface program means including the address of said pointer for locating said first memory address table.

4. The controller of claim 2 wherein said interface program means further includes
a function table for storing said table entry index and said first memory table entry index, said function table being accessible by said interface program means using said identifier of said program call.

5. The controller of claim 2 wherein said first memory further includes a function index table for storing a plurality of identifiers each identifying a particular instruction set located on either said first memory or on each of said second memories, said function index table accessible by said interface calling means for obtaining an identifier which identifies a particular instruction set being called, said identifier being included in said program call.

6. An interchangeable memory selectable from a plurality of interchangeable memories adapted for use in a programmed controller of a communication system for controlling communication between a plurality of communication lines in response to instruction sets located in a first memory of said controller and said interchangeable memory, said controller executing each instruction set to perform a predetermined communication function, said first memory including a first group of instruction sets, each of said instruction sets extending from a starting address, and an interface calling means for generating a program call to an interface program means at a common address on each of said plurality of interchangeable memories, said program call including an identifier; and said interchangeable memory comprising a second group of instruction sets, each of said second group of instruction sets extending from a starting address,
an address table for storing in a fixed order the starting addresses of each of said second group of instruction sets, the address table within each said interchangeable memory not being located at an address which is the same for each of said plurality of interchangeable memories;
a table entry index for accessing a particular instruction set starting address within the address table and
interface program means located at a common address within each of said plurality of interchangeable memories for instructing said controller therefrom, said interface program means including the address of said address table and said starting address of said first group of instruction sets and responsive to a program call from said controller including said identifier for selecting said table entry index for either locating in said first memory the starting address of a particular instruction set for locating in each interchangeable memory the starting address of a particular instruction set using said address table and said table entry index generated from said identifier.

7. The interchangeable memory of claim 6 arranged for use with said controller, wherein said first memory of said controller further includes a first memory address table for storing in a fixed order the starting addresses of each of said first group of instruction sets, and a first memory table entry index for accessing a particular starting address within the first memory address table; and wherein said interface program means of said interchangeable memory further comprises the address of said first memory table entry index for locating in said first memory the starting address of a particular instruction set.

8. The interchangeable memory of claim 6 arranged for use with said controller, wherein said controller further includes a plurality of interchangeable first memories each having a first memory address table not being located at the same memory address, and a pointer located at a common address within each of said first memories for storing the address of said first memory address table, and wherein said interface program means of said interchangeable memory further comprises the address of said pointer for locating said first memory address table.

9. The interchangeable memory of claim 6 wherein said interface program means further includes a function table for storing said table entry index and said first memory table entry index, said function table being accessible by said interface program means using said identifier of said program call.

* * * * *

UNITED STATES PATENT AND TRADEMARK OFFICE
CERTIFICATE OF CORRECTION

PATENT NO. : 4,703,416

DATED : October 27, 1987

INVENTOR(S) : Joseph A. Crupi, David J. Hayward, David F. Jones

It is certified that error appears in the above-identified patent and that said Letters Patent is hereby corrected as shown below:

Column 1, line 36, "program" should read --provide--.

Column 4, line 38, "responsive" should read --responsible--.

line 39, "harhdware" should read --hardware--.

Column 6, line 4, "partition" should read --partitioning--.

Column 7, line 66, "addreess" should read --address--.

Column 10, line 57, "for locating" should read --or locating--.

Signed and Sealed this

Tenth Day of January, 1989

Attest:

DONALD J. QUIGG

Attesting Officer      Commissioner of Patents and Trademarks